(12) United States Patent
Peak

(10) Patent No.: US 8,142,045 B2
(45) Date of Patent: Mar. 27, 2012

(54) UTILITY LIGHT WITH ARTICULATING MOUNTING LEGS ADAPTED WITH SUCTION CUP FASTENERS

(76) Inventor: Jason Peak, Sunrise, FL (US)

( * ) Notice: Subject to any disclaimer, the term of this patent is extended or adjusted under 35 U.S.C. 154(b) by 183 days.

(21) Appl. No.: 12/773,482

(22) Filed: May 4, 2010

(65) Prior Publication Data
US 2010/0277899 A1 Nov. 4, 2010

Related U.S. Application Data

(60) Provisional application No. 61/175,192, filed on May 4, 2009.

(51) Int. Cl.
*F21L 4/00* (2006.01)
(52) U.S. Cl. ......... 362/191; 362/199; 362/397; 362/183
(58) Field of Classification Search .................. 362/183, 362/199, 191, 397
See application file for complete search history.

(56) References Cited

U.S. PATENT DOCUMENTS

| | | | |
|---|---|---|---|
| 1,932,143 A | 10/1933 | Piercy | |
| 2,675,545 A | 4/1954 | Wolper | |
| 2,905,925 A | 9/1959 | Whiteneck | |
| 4,506,317 A | 3/1985 | Duddy | |
| 4,907,769 A | 3/1990 | Hunley, Jr. et al. | |
| 5,101,333 A | 3/1992 | Glassford | |
| 5,491,621 A * | 2/1996 | Duty | 362/397 |
| 5,541,822 A * | 7/1996 | Bamber | 362/190 |
| 5,577,697 A | 11/1996 | Accordino | |
| 5,993,022 A | 11/1999 | Neyer et al. | |
| 6,012,824 A | 1/2000 | Sharrah et al. | |
| 6,457,841 B1 | 10/2002 | Lynch et al. | |
| 6,669,353 B2 | 12/2003 | Kung | |
| 6,913,370 B2 | 7/2005 | Ping | |
| 6,913,371 B2 | 7/2005 | Ping | |
| 6,953,260 B1 * | 10/2005 | Allen | 362/194 |
| 6,963,275 B2 | 11/2005 | Smalls | |
| 7,063,444 B2 * | 6/2006 | Lee et al. | 362/285 |
| 7,296,909 B2 | 11/2007 | Van Deurson et al. | |
| 7,338,189 B2 | 3/2008 | Kovacik et al. | |
| 7,342,360 B2 | 3/2008 | Van Deursen et al. | |
| 7,364,320 B2 | 4/2008 | Van Deursen et al. | |
| 2003/0067771 A1 * | 4/2003 | Kung | 362/191 |
| 2006/0104069 A1 * | 5/2006 | Beveridge et al. | 362/397 |

* cited by examiner

*Primary Examiner* — Evan Dzierzynski
(74) *Attorney, Agent, or Firm* — Mark D. Bowen, Esq.; Malin Haley DiMaggio Bowen & Lhota, P.A.

(57) ABSTRACT

A portable utility light is provided for removable mounting to a surface, such as the side of an automobile, for providing temporary emergency lighting. The utility light includes a main body having first end portion adapted with mounting structure to facilitate removable attachment to a smooth surface, and a second end portion adapted with light emitting device, such as one or more light emitting diodes ("LED's"). The main body comprises an elongate generally cylindrical structure wherein the first and second portions are connected and capable of rotation relative to one another about an elongate axis. The main body first end includes a battery compartment for housing a battery power source, and is further adapted with a plurality of circumferentially spaced articulating legs.

10 Claims, 5 Drawing Sheets

UTILITY LIGHT WITH ARTICULATING MOUNTING LEGS ADAPTED WITH SUCTION CUP FASTENERS

CROSS REFERENCE TO RELATED APPLICATIONS

This application claims the benefit of provisional U.S. Patent Application Ser. No. 61/175,192, filed on May 4, 2009.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates generally to mountable utility lights, and more particularly to a utility light apparatus having a mounting base with a plurality of adjustable articulating legs adapted with suction cup fasteners for removable attachment to a surface.

2. Description of Related Art

Portable lightweight lamps, commonly known as task lighting or utility lights, are frequently required where a main lighting source fails to provide adequate illumination. Such portable lights feature lightweight housing, a power source, are easily maneuverable, and are generally capable of producing substantial light emission. A common use for such task lighting is in connection with automobile repairs. Frequently, the need arises for use of a portable lighting source while traveling or away from home. Although an array of lighting sources are commercially available, prior art fails to show a portable, battery-powered i.e. cordless apparatus, which features LED lights on a swiveling mount, an adjustably articulating and telescoping tripod base, and suction attachment capabilities.

As a result of the limitations and disadvantages present with the use of conventional task lighting, the background art reveals a number of attempts directed to providing improved illumination devices. For example, U.S. Pat. No. 1,932,143, issued to Piercy, discloses an incandescent bulb with magnetic attachment capabilities. The magnet is adapted for mounting on a horizontal or vertical metal supporting surface. U.S. Pat. No. 2,675,545, issued to Wolper, and U.S. Pat. No. 2,905,925, issued to Whiteneck disclose flashing safety lamps with suction cup attachment features and an electrical cord power connection to the cigarette lighter. U.S. Pat. No. 4,506,317, issued to Duddy, discloses a magnetically attachable clamp device for supporting a flashlight. U.S. Pat. No. 4,907,769, issued to Hunley, Jr. et al., discloses a magnetic flashlight holder with tripod base for improved focus of illumination. The light source, i.e. bulb, is ancillary to the invention. U.S. Pat. No. 5,101,333, issued to Glassford, discloses a utility light with articulating arm, clamp attachment, and power cord for connection to an electrical outlet. U.S. Pat. No. 6,963,275, issued to Smalls, discloses a portable fixed-position warning light with LED lights and suction cup base, powered by power connection to a cigarette lighter, dry cell batteries or solar cell. U.S. Pat. No. 7,338,189, issued to Kovacik et al., discloses a LED light source with plug connection and removable magnet assembly. U.S. Pat. No. 7,364,320, issued to Van Deursen et al., discloses a battery-powered pivoting flashlight with a base featuring articulating legs.

The references of the background art are burdened by a host of limitations and disadvantages and have otherwise failed to achieve widespread commercial success. Accordingly, there exists a need for an improved utility light that is specifically adapted for removable attachment to a vehicle, such as an automobile, to provide a source of light in emergency situations.

BRIEF SUMMARY OF THE INVENTION

The present invention overcomes the limitations and disadvantages present in the art by providing a portable utility light that is removably mountable to a surface, such as the side of an automobile, for providing temporary emergency lighting. A utility light in accordance with the present invention includes a main body having first end portion adapted with mounting structure to facilitate removable attachment to a smooth surface, and a second end portion adapted with light emitting device, such as one or more light emitting diodes ("LED's"). The portable utility light of the present invention is particularly suitable for mounting to the side of a vehicle for providing illumination when changing a tire at night.

In a preferred embodiment, the main body comprises an elongate generally cylindrical structure wherein the first and second portions are connected and capable of rotation relative to one another about an elongate axis of the main body. In a preferred embodiment, the second end is connected to the first end by a swivel connection that allows relative rotation of approximately 270-degrees. The main body first end includes a battery compartment for housing a battery power source, and is further adapted with a plurality of circumferentially spaced articulating legs. Each articulating leg is configurable between a stowed configuration wherein the leg is substantially parallel with the longitudinal axis of the main body, and a deployed configuration wherein the leg is angularly disposed outward. Each leg includes a distal end having a suction cup, or other attachment structure (e.g. magnet), connected thereto for removable attachment to a smooth surface, such as the side of a vehicle. The combination of three deployable articulating legs terminating in suction cups, allows the main body to be easily configured for removable attachment to a vehicle side panel of virtually any shape or contour. The main body second end includes a light source pivotally connected thereto to allow for 270-degree pivotal positioning and adjustment thereof when in use. Reflective material may be affixed to the main body to reflect light from oncoming vehicles in roadside environments.

The present invention thus provides a utility light that may be quickly and easily put into use by positioning the legs such that the suction cups may be moved into engagement with a surface, such as a vehicle fender panel when changing a flat tire, so as to provide illumination to a desired area. In an alternate embodiment, one or more additional lighting units are provided for additional illumination.

Accordingly, it is an object of the present invention to provide an improved battery powered utility light.

Another object of the present invention is to provide a utility light specifically adapted for removable, temporary attachment to a vehicle surface to provide illumination when changing a flat tire at night.

Still another object of the present invention is to provide a utility light having a highly adaptable mounting structure to allow for custom configuration to enable removable attachment to vehicle panels of various shapes.

These and other objects are met by the present invention which will become more apparent from the accompanying drawing and the following detailed description of the drawings and preferred embodiments.

DETAILED DESCRIPTION OF THE INVENTION

Figure 1:
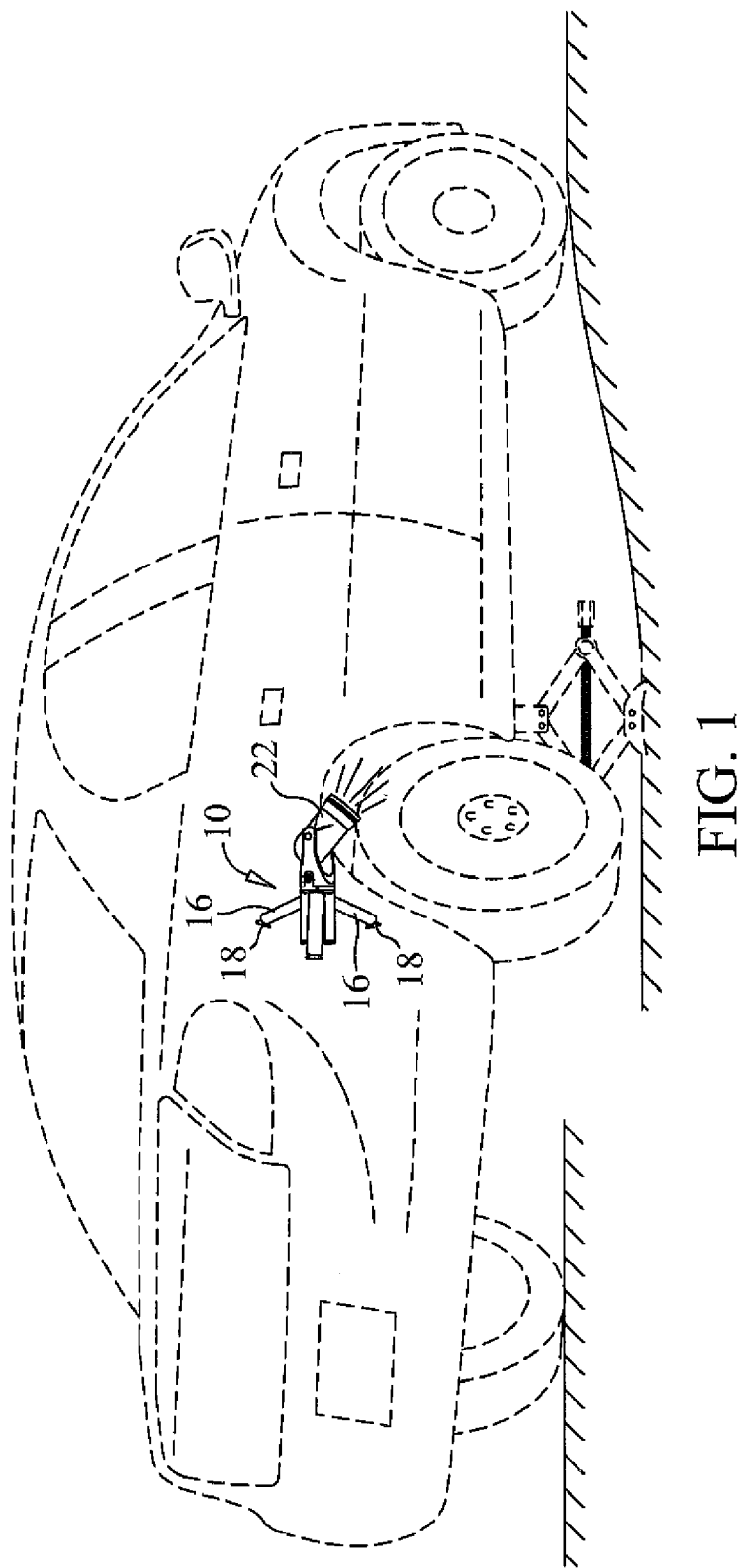
FIG. 1 illustrates a utility light in accordance with the present invention deployed for use on a vehicle.

With reference now to the drawings, FIGS. 1-5 depict a portable, battery-powered utility light, generally referenced as 10, in accordance with the present invention. The present invention provides a portable utility light that is removably mountable to a surface, such as the side of an automobile, for providing temporary emergency lighting as illustrated in FIG. 1. A utility light in accordance with the present invention is particularly useful by motorists tasked with having to change a flat tire in any low-light condition.

Utility light 10 includes a main body, generally referenced as 11, which comprises an elongate generally cylindrical structure generally including a first end portion 12 and a second end portion 14. The first and second end portions, referenced as 12 and 14 respectively, are adapted to a swivel relative to one another, preferably having a high-degree of freedom of swiveling movement. In a preferred embodiment, the first and second end portions are capable of approximately 270-degrees of rotational movement. Providing a high-degree of freedom of movement is considered important to maximize the user's ability to shine light on his/her work area.

Figure 2:
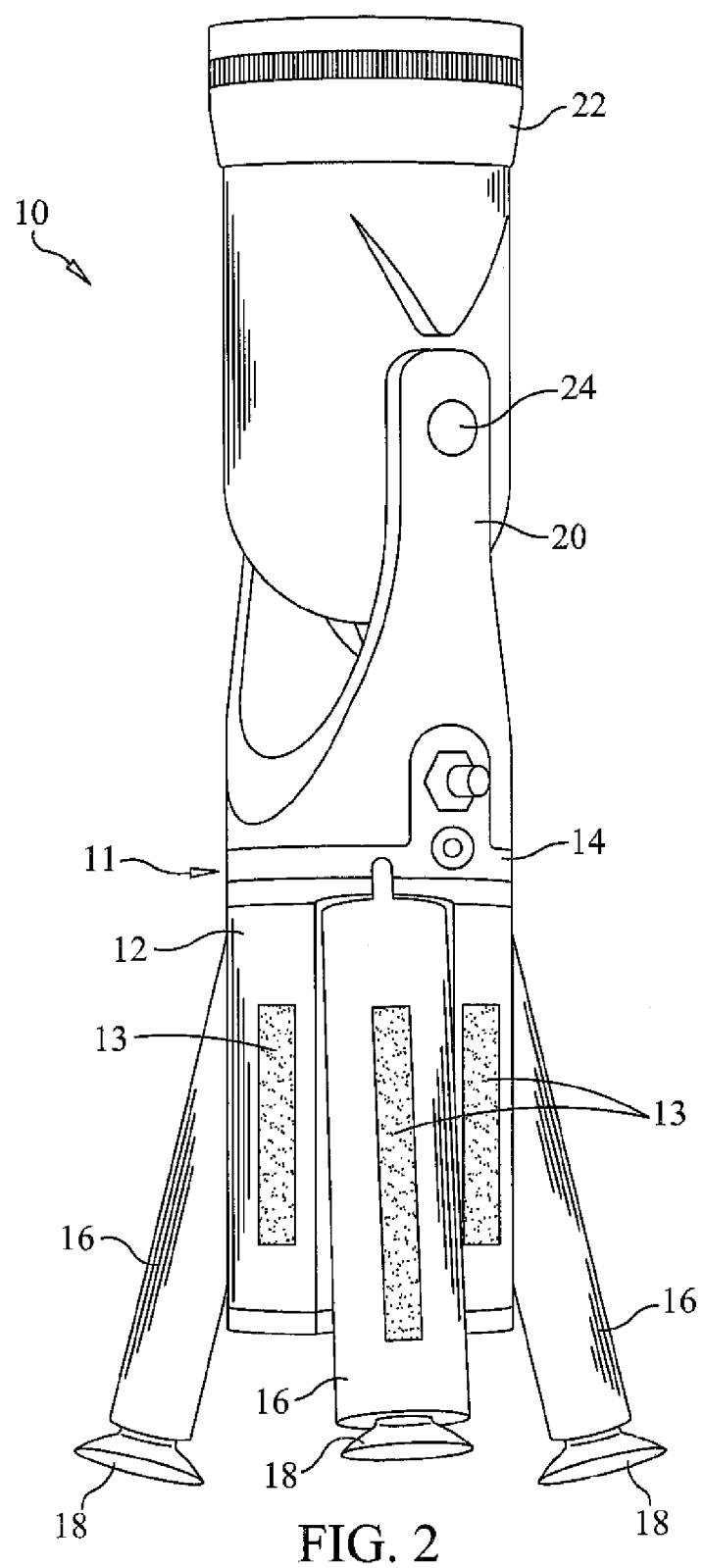
FIG. 2 is a side view of a utility light in accordance with the present invention with the articulating legs deployed.
Figure 3:
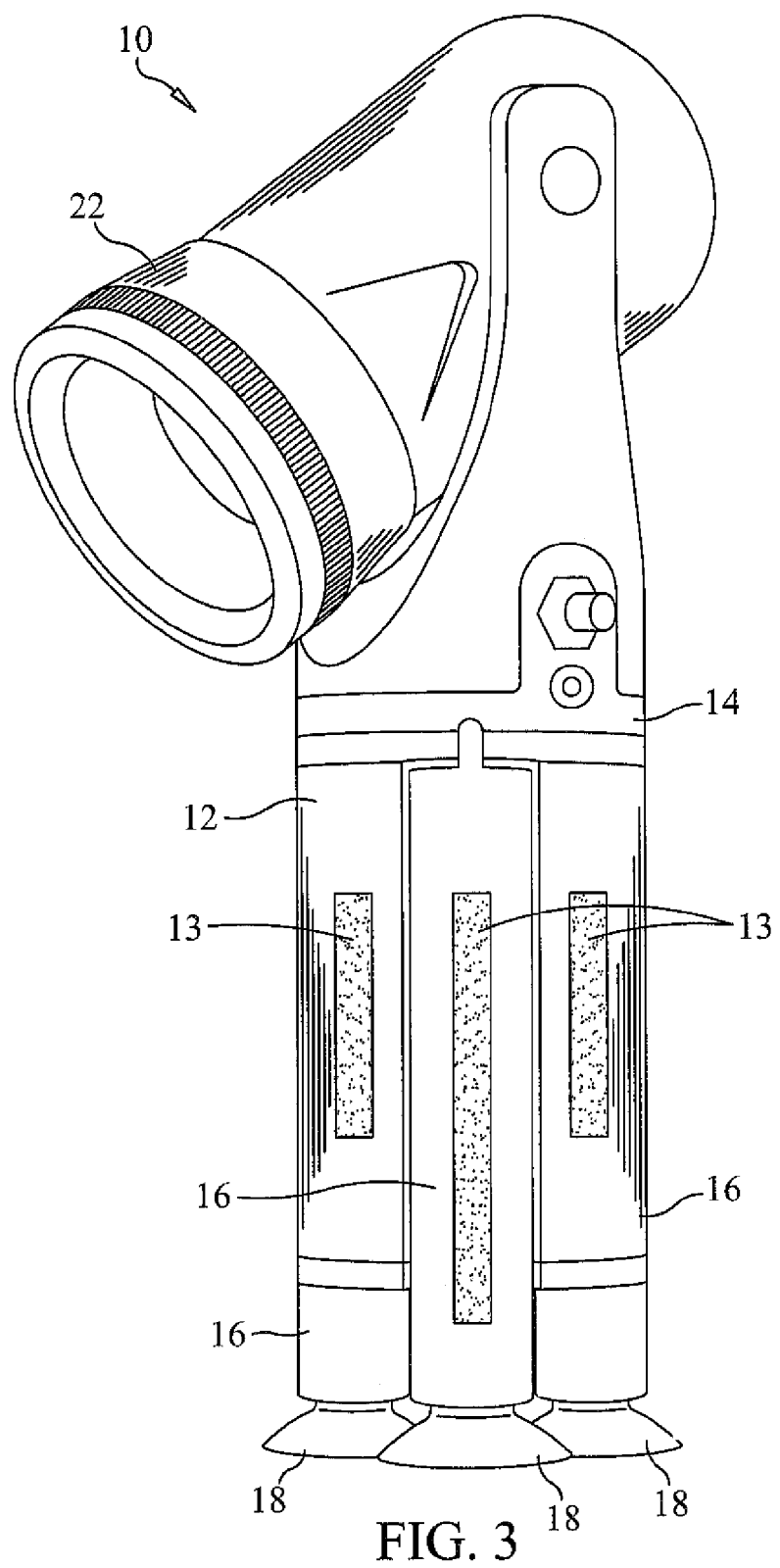
FIG. 3 is a side perspective view of the utility light with the articulating legs in the stowed configuration and illuminating head pivotally positioned.
Figure 4:
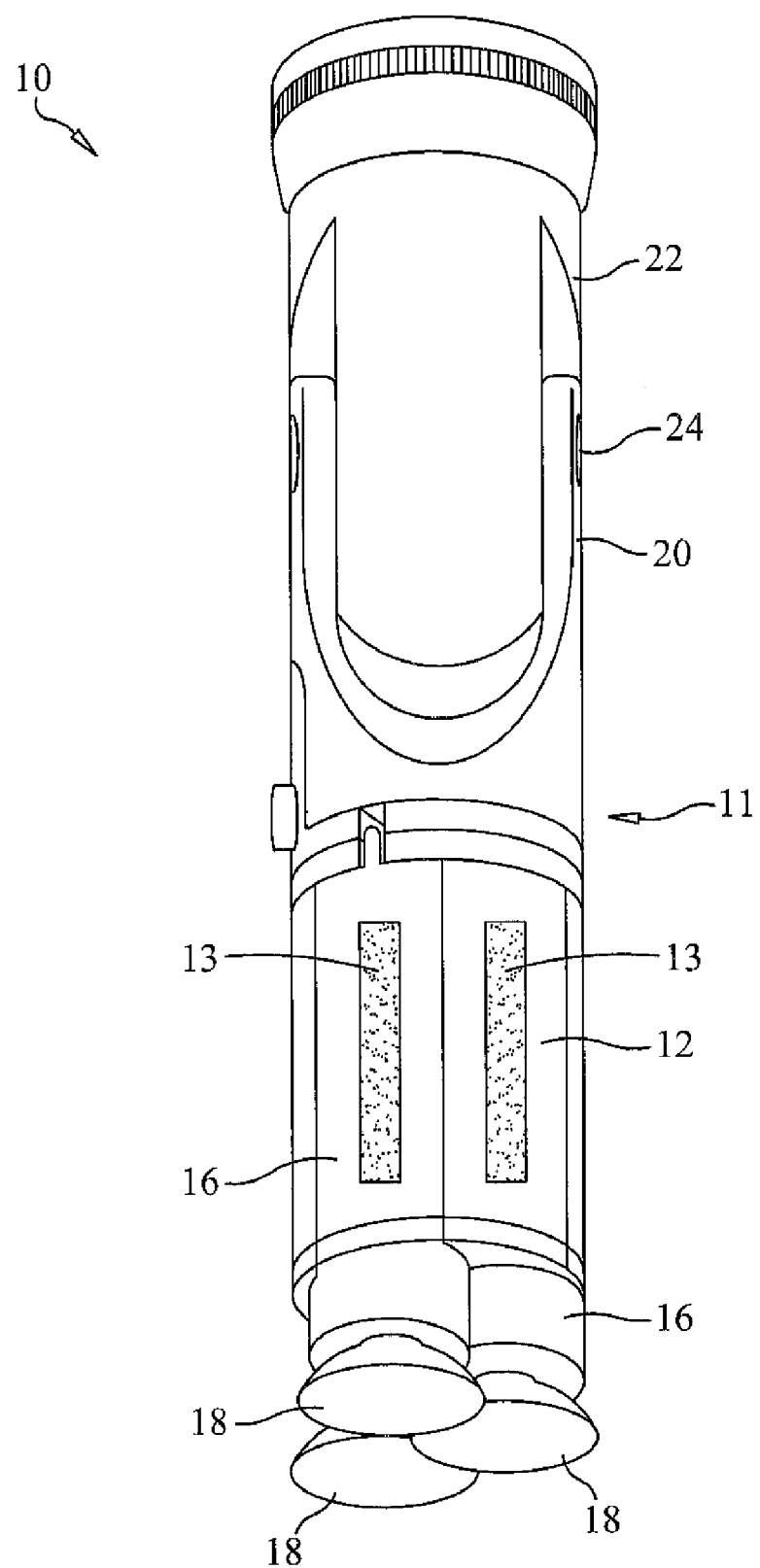
FIG. 4 is a bottom perspective view of the utility light.

First end portion 12 of main body 11 includes a plurality of articulating legs, each referenced as 16. Each leg 16 has a proximal end that is hingedly connected to the first end portion 12 and a distal end projecting from main body 11. By attaching legs 16 to the first end portion of main body 11 by hinge connections allows for articulation of the legs between deployed and stowed configurations. Each leg 16 terminates at a distal end, and includes a suction cup 18 connected thereto. The suction cups function to allow utility light 10 to be removably affixed to a smooth surface, such as a vehicle body panel (i.e. fender). In a contemplated alternate embodiment, a magnet (not shown) may be used in lieu of suction cup 18 to facilitate removable magnetic attachment. FIG. 2 illustrates utility light 10 with legs 16 in the deployed configuration, and FIG. 3 illustrates utility light 10 with legs 16 in the stowed configuration. As should be apparent, the legs may be deployed independently based on the requirement. Accordingly, the user may only need to deploy one or two legs while leaving the other leg(s) in the stowed configuration. As best illustrated in FIGS. 2 and 4, the outer circumference of first end portion 12 is scallop-shaped so as to define a plurality of recessed notches 12a, each of which is sized and shaped for substantially receiving a corresponding leg 16 when in the stowed configuration such that a generally cylindrical shape is formed by first end portion 12 and legs 16 when in the stowed configuration.

Legs 16 and/or other portions of utility light 10 may includes reflective material for reflecting lights from oncoming traffic when utility light 10 is deployed on a vehicle disposed along the side of a road at night. Reflective material 13 may be affixed to the main body by adhesive or any other suitable method.

The second end portion 14 of main body 11 terminates in a generally U-shaped mounting structure 20 having an illumination head 22 mounted thereto. Illumination head 22 is connected to mounting structure 20, having opposing arms 21, via a pivotal connection 24 such that illumination head 22 may pivot approximately 270-degress in opposing first and second directions. Illumination head 22 defines opposing, generally V-shaped, projecting structures that function to engage arms 21 of U-shaped mounting structure 20 when illumination head 22 reaches a fully articulated position. Illumination head 20 contains a light source comprising, a plurality of light emitting diodes ("LED's") 23 in electrical communication with the battery power source contained within first end portion 12 of main body 11. In a preferred embodiment, LEDs 23 comprise long lasting LEDs (e.g. over 50,000 hrs.) each providing over 100 lm (Lumens/Luminous Flux) operating at approximately 7,500 Kelvin (cool white). While the present invention discloses the use of LED's, any suitable source of illumination or light emitting device is considered within the scope of the present invention. A manual switch 26 allows the user to turn the light source on and off. In a first embodiment, switch 26 is a simple on/off switch. In a contemplated alternate embodiment, however, switch 26 may comprise a multi-position switch allowing the user to select between low, medium, and high, levels of illumination. In an alternative embodiment, the light source may be actuated by the deployment of legs 16 from the stowed configuration. A battery charging port 28 is provided to allow for recharging of the batteries from a conventional vehicle power outlet (e.g. cigarette lighter connector).

Figure 5:
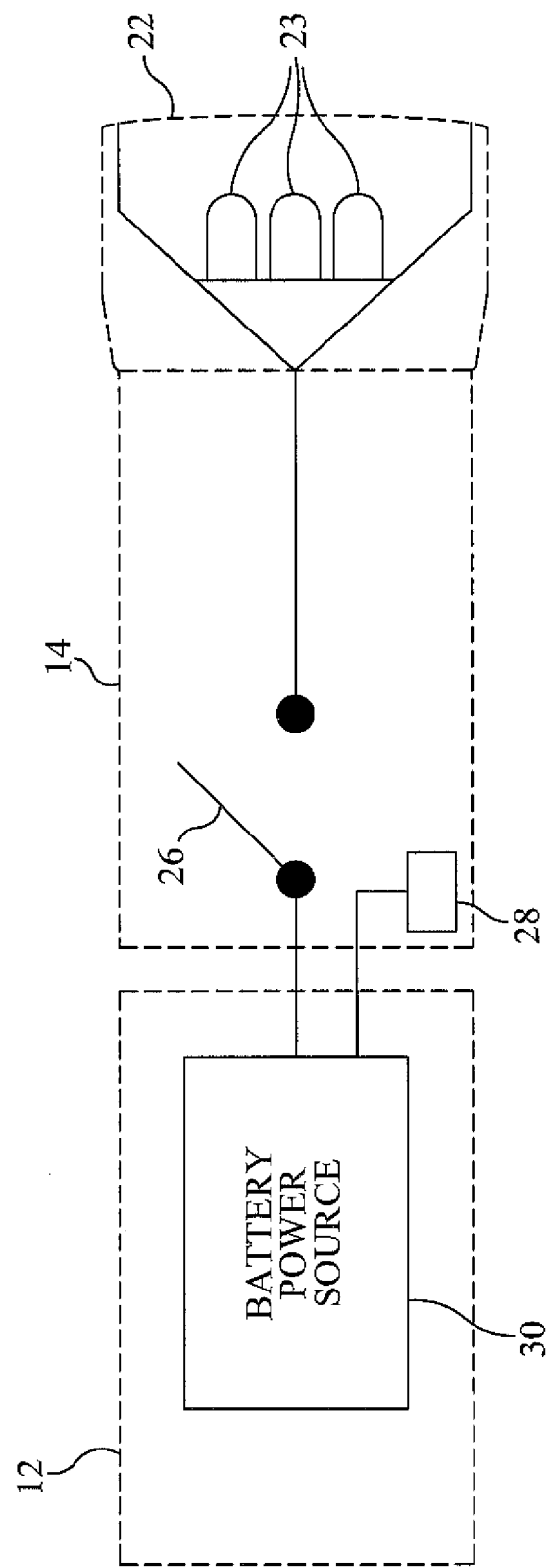
FIG. 5 is an electrical block diagram illustrating electro-mechanical components.

FIG. 5 is an electrical block diagram illustrating the electro-mechanical components of the present invention. A rechargeable battery power source 30 is in electrical communication with switch 26 for selectively providing power to LEDs 23 contained within illumination head 22. Battery power source 30 preferably comprises 3 AA Lithium Ion rechargeable batteries, however, any suitable battery power source is considered within the scope of the present invention.

The present invention thus provides a utility light that may be quickly and easily deployed by extension of one or more legs 16 such that the suction cups 18 may be moved into engagement with a surface, such as a vehicle fender panel when changing a flat tire, so as to provide illumination to a desired area as illustrated in FIG. 1.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A portable utility light for providing temporary emergency lighting comprising:

an elongate main body formed about a longitudinal axis, said main body including first and second end portions connected by a swivel connection that allows for relative rotational movement between said first and second end portions about said axis;

said first end portion including a plurality of articulating legs, each leg having a proximal end hingedly connected to said first end portion and a distal end, each leg substantially received within a longitudinally aligned recessed notch defined by an outer surface of said first end portion, each leg capable of articulation between a stowed configuration wherein the leg is substantially received within said recessed notch, and a deployed configuration wherein the leg projects angularly outward from said main body;

each leg distal end having a suction cup connected thereto;

said second end portion including a generally U-shaped mounting structure having opposing arms;

an illumination head pivotally mounted to said mounting structure and generally disposed between said arms;

said illumination head defining opposing projecting structures that function to engage the arms of said U-shaped mounting structure said illumination head reaches a maximum pivotal position.

2. A portable utility light according to claim 1, further including reflective material affixed to said main body.

3. A portable utility light according to claim 1, further including a battery power source.

4. A portable utility light according to claim 3, wherein said battery power source is rechargeable.

5. A portable utility light according to claim 4, further including an electrical charging port for electrically charging said battery power source.

6. A portable utility light according to claim 1, wherein said illumination head includes at least one light-emitting diode.

7. A portable utility light for providing temporary emergency lighting comprising:

an elongate main body formed about a longitudinal axis, said main body including first and second end portions connected by a swivel connection that allows for approximately 270-degrees of relative rotational movement between said first and second end portions about said axis;

said first end portion including a plurality of articulating legs, each leg having a proximal end hingedly connected to said first end portion and a distal end, each leg substantially received within a longitudinally aligned recessed notch defined by an outer surface of said first end portion, each leg capable of articulation between a stowed configuration wherein the leg is substantially received within said recessed notch, and a deployed configuration wherein the leg projects angularly outward from said main body;

said first end portion and said legs forming a generally cylindrical structure with the legs in said stowed configuration;

each leg distal end having a suction cup connected thereto;

said second end portion including a generally U-shaped mounting structure having opposing arms;

an illumination head pivotally mounted to said mounting structure and generally disposed between said arms, said illumination head including at least one light emitting device;

said illumination head defining opposing, generally V-shaped, projecting structures that function to engage the arms of said U-shaped mounting structure said illumination head reaches a maximum pivotal position;

said main body containing a battery power source, said battery power source in electrical communication with said at least one light emitting device, said electrical communication controlled by a manual switch.

8. A portable utility light according to claim 7, further including reflective material affixed to said main body.

9. A portable utility light according to claim 7, wherein said battery power source is rechargeable.

10. A portable utility light according to claim 9, further including an electrical charging port for electrically charging said battery power source.

* * * * *